United States Patent
Huang

(10) Patent No.: US 11,470,476 B2
(45) Date of Patent: Oct. 11, 2022

(54) DISTANCE-BASED PACKET FILTERING METHOD FOR COMPARING VEHICLE DISTANCE WITH MAXIMUM FILTERING DISTANCE AND SYSTEM THEREOF

(71) Applicant: Wistron NeWeb Corporation, Hsinchu (TW)

(72) Inventor: Wang-Hsing Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 218 days.

(21) Appl. No.: 16/862,618

(22) Filed: Apr. 30, 2020

(65) Prior Publication Data
US 2021/0067970 A1    Mar. 4, 2021

(30) Foreign Application Priority Data
Sep. 2, 2019 (TW) ................. 108131560

(51) Int. Cl.
*H04W 12/088* (2021.01)
*H04W 4/40* (2018.01)

(52) U.S. Cl.
CPC ........... *H04W 12/088* (2021.01); *H04W 4/40* (2018.02)

(58) Field of Classification Search
CPC .............................. H04W 12/088; H04W 4/40
USPC ......................................................... 726/13
See application file for complete search history.

(56) References Cited

U.S. PATENT DOCUMENTS

| | | | |
|---|---|---|---|
| 10,225,690 B2 | 3/2019 | Grotendorst et al. | |
| 2016/0036558 A1* | 2/2016 | Ibrahim | H04W 4/027 455/297 |
| 2019/0096144 A1* | 3/2019 | Noh | H04W 12/66 |
| 2019/0342859 A1* | 11/2019 | Rubin | G08G 1/052 |
| 2020/0326203 A1* | 10/2020 | Lund | H04W 4/027 |

FOREIGN PATENT DOCUMENTS

CN        105474029 B     4/2016

* cited by examiner

*Primary Examiner* — Bryan F Wright
(74) *Attorney, Agent, or Firm* — McClure, Qualey & Rodack, LLP

(57) ABSTRACT

A distance-based packet filtering method includes a maximum filtering distance calculating step, a vehicle distance calculating step and a packet filtering step. The maximum filtering distance calculating step is performed to configure a processing unit to calculate a maximum filtering distance according to a dynamic adjustment distance parameter. The vehicle distance calculating step is performed to configure a modem to obtain a host vehicle location message and a vehicle-to-everything (V2X) safety packet. The V2X safety packet includes a remote vehicle location message, and then the host vehicle location message and the remote vehicle location message are calculated to generate a vehicle distance. The packet filtering step is performed to configure the modem to compare the vehicle distance with the maximum filtering distance from the processing unit to generate a comparison result, and judge whether the V2X safety packet is a passed packet according to the comparison result.

14 Claims, 8 Drawing Sheets

DISTANCE-BASED PACKET FILTERING METHOD FOR COMPARING VEHICLE DISTANCE WITH MAXIMUM FILTERING DISTANCE AND SYSTEM THEREOF

RELATED APPLICATIONS

This application claims priority to Taiwan Application Serial Number 108131560, filed Sep. 2, 2019, which is herein incorporated by reference.

BACKGROUND

Technical Field

The present disclosure relates to a packet filtering method and a system thereof. More particularly, the present disclosure relates to a distance-based packet filtering method and a system thereof.

Description of Related Art

In recent years, vehicle-to-everything (V2X) technology has flourished in many fields. In order to prevent a fraud, a signature verification of safety packets usually need to be performed before transmission. At a receiving end of one of other vehicles or road side units, a series of inspections must be performed on the received safety packets. One of the inspections that consumes most of system resources is for verifying the correctness of the signature. Assuming that a V2X equipped vehicle sends ten safety packets having signatures per second. At a busy intersection, the receiving end of the one of other vehicles or road side units may receive the safety packets from up to one hundred V2X equipped vehicles per second, that is, the receiving end of the one of other vehicles or road side units may receive up to one thousand safety packets per second. An intelligent transportation system software (ITS SW) of the vehicles has to face great challenges.

A conventional technology, e.g., quality of service (QoS), usually determines the processing priority of the safety packets according to a network traffic status, types of the safety packets or a distance of the network topology. However, for V2X technology of an ad hoc wireless network, the distance of the network topology cannot be effectively defined, so that it cannot be applied to the ITS SW. Therefore, the conventional technology causes unnecessary consumption in the system resources. In addition, the conventional technology cannot process a part of the safety packets having small vehicle distances due to a lack of the system resources, thereby being easy to create a security breach.

Therefore, a distance-based packet filtering method and a distance-based packet filtering system which are capable of effectively using the system resources, improving system security and being suitable for a low-cost or low-order system architecture are commercially desirable.

SUMMARY

According to one aspect of the present disclosure, a distance-based packet filtering method includes a maximum filtering distance calculating step, a vehicle distance calculating step and a packet filtering step. The maximum filtering distance calculating step is performed to configure a processing unit to calculate a maximum filtering distance according to a dynamic adjustment distance parameter. The vehicle distance calculating step is performed to configure a modem to obtain a host vehicle location message and at least one vehicle-to-everything (V2X) safety packet. The at least one V2X safety packet includes at least one remote vehicle location message, and then the host vehicle location message and the at least one remote vehicle location message are calculated to generate at least one vehicle distance. The packet filtering step is performed to configure the modem to compare the at least one vehicle distance with the maximum filtering distance from the processing unit to generate a comparison result, and judge whether the at least one V2X safety packet is at least one passed packet according to the comparison result.

According to another aspect of the present disclosure, a distance-based packet filtering method includes a maximum filtering distance calculating step, a vehicle distance calculating step and a packet filtering step. The maximum filtering distance calculating step is performed to configure a processing unit to calculate a maximum filtering distance according to a dynamic adjustment distance parameter. The vehicle distance calculating step is performed to configure the processing unit to obtain a host vehicle location message and at least one V2X safety packet from a modem. The at least one V2X safety packet includes at least one remote vehicle location message, and then the host vehicle location message and the at least one remote vehicle location message are calculated to generate at least one vehicle distance. The packet filtering step is performed to configure the processing unit to compare the at least one vehicle distance with the maximum filtering distance to generate a comparison result, and judge whether the at least one V2X safety packet is at least one passed packet according to the comparison result.

According to further another aspect of the present disclosure, a distance-based packet filtering system is configured to filter at least one V2X safety packet transmitted from at least one remote vehicle to a host vehicle. The distance-based packet filtering system includes a processing unit and a modem. The processing unit is disposed on the host vehicle. The processing unit is configured to calculate a maximum filtering distance according to a dynamic adjustment distance parameter. The modem is disposed on the host vehicle and signally connected to the processing unit. The modem is configured to obtain at least one V2X safety packet, and the at least one V2X safety packet includes at least one remote vehicle location message. One of the processing unit and the modem obtains a host vehicle location message, the maximum filtering distance and the at least one V2X safety packet. The host vehicle location message and the at least one remote vehicle location message are calculated to generate at least one vehicle distance, and then the one of the processing unit and the modem is configured to compare the at least one vehicle distance with the maximum filtering distance to generate a comparison result, and judge whether the at least one V2X safety packet is at least one passed packet according to the comparison result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
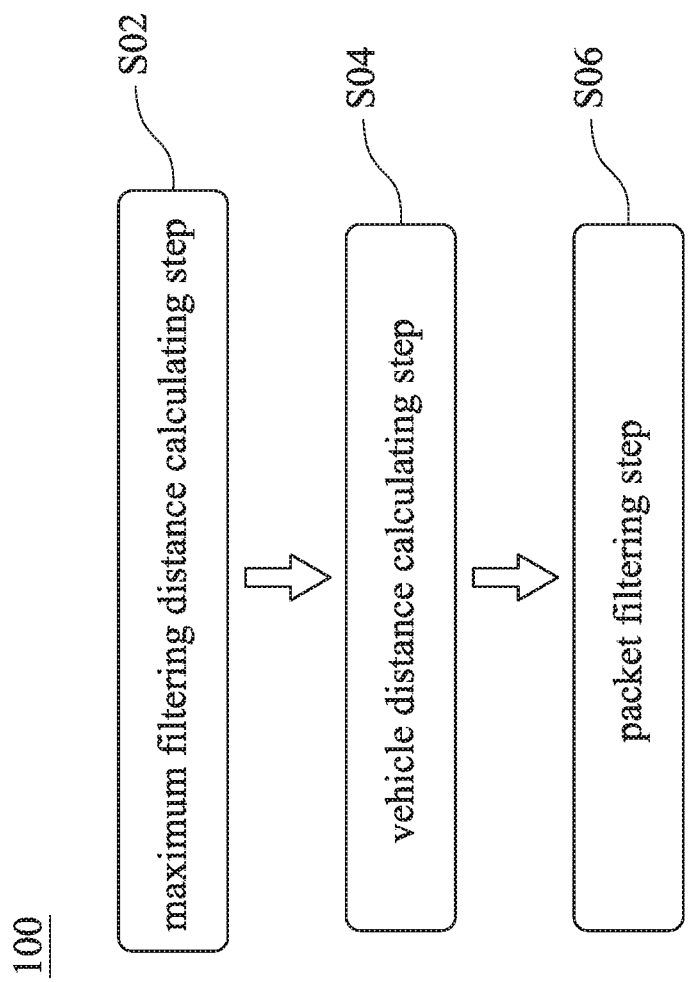
FIG. 1 shows a flow chart of a distance-based packet filtering method according to a first embodiment of the present disclosure.
Figure 2:
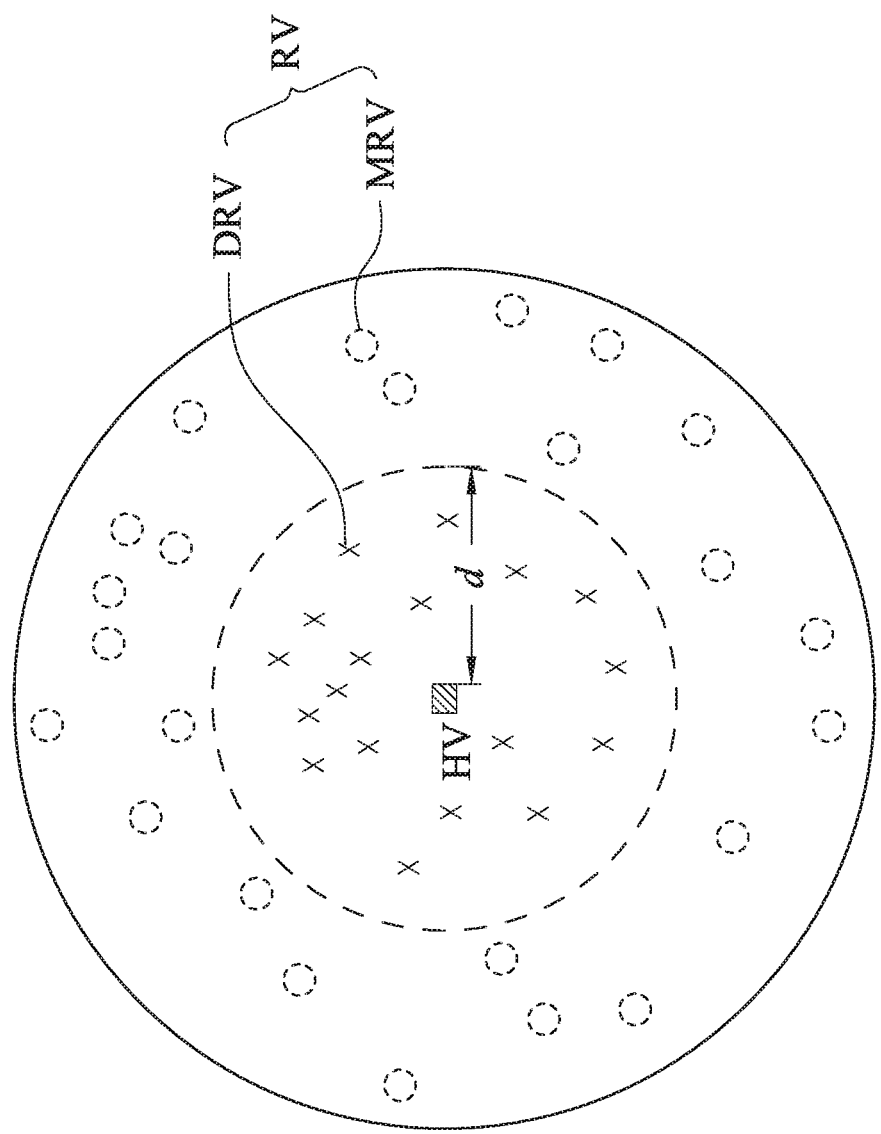
FIG. 2 shows a schematic view of an application environment of the distance-based packet filtering method of FIG. 1.
Figure 3:
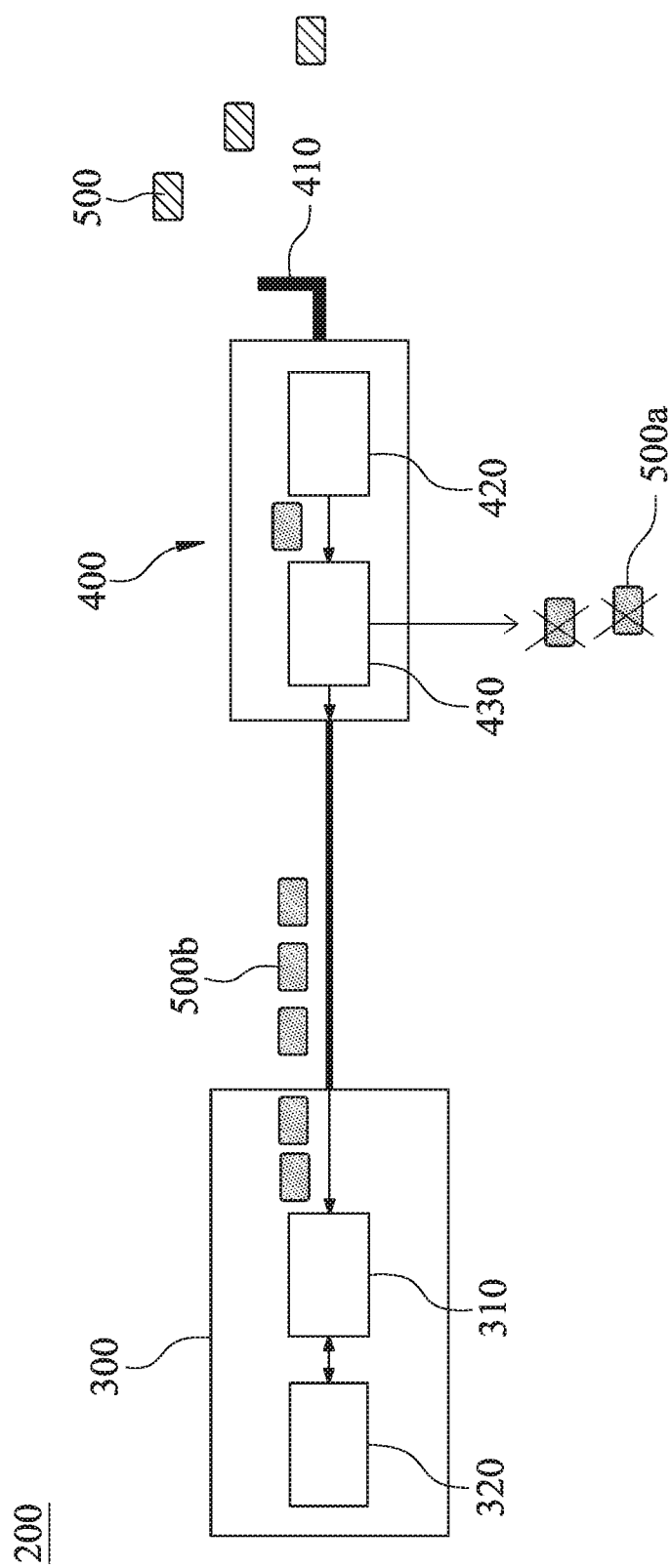
FIG. 3 shows a block diagram of a distance-based packet filtering system according to a second embodiment of the present disclosure.
Figure 6:
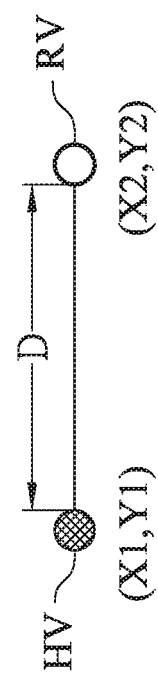
FIG. 6 shows a schematic view of a vehicle distance between a host vehicle and a remote vehicle of FIG. 2.

Please refer to FIGS. 1, 2, 3 and 6. FIG. 1 shows a flow chart of a distance-based packet filtering method 100 according to a first embodiment of the present disclosure. FIG. 2 shows a schematic view of an application environment of the distance-based packet filtering method 100 of FIG. 1. FIG. 3 shows a block diagram of a distance-based packet filtering system 200 according to a second embodiment of the present disclosure. FIG. 6 shows a schematic view of a vehicle distance D between a host vehicle HV and a remote vehicle RV of FIG. 2. The distance-based packet filtering method 100 of FIG. 1 is applied to the distance-based packet filtering system 200 of FIG. 3, and a modem 400 is configured to filter at least one vehicle-to-everything (V2X) safety packet 500. The distance-based packet filtering method 100 includes a maximum filtering distance calculating step S02, a vehicle distance calculating step S04 and a packet filtering step S06. The steps of the distance-based packet filtering method 100 are carried out in order of the maximum filtering distance calculating step S02, the vehicle distance calculating step S04 and the packet filtering step S06.

The maximum filtering distance calculating step S02 includes configuring a processing unit 300 to calculate a maximum filtering distance d according to a dynamic adjustment distance parameter. The dynamic adjustment distance parameter includes at least one of a current vehicle velocity, a number of queueing packets and a load factor of the processing unit 300. In other embodiment, the maximum filtering distance d can be calculated by the modem 400, but it is not limited thereto.

The vehicle distance calculating step S04 includes configuring the modem 400 to obtain a host vehicle location message and at least one V2X safety packet 500. The at least one V2X safety packet 500 includes at least one remote vehicle location message, and then the host vehicle location message and the at least one remote vehicle location message are calculated to generate at least one vehicle distance D.

The packet filtering step S06 includes configuring the modem 400 to compare the at least one vehicle distance D with the maximum filtering distance d from the processing unit 300 to generate a comparison result, and judge whether the at least one V2X safety packet 500 is the at least one passed packet 500b according to the comparison result. Therefore, the distance-based packet filtering method 100 of the present disclosure utilizes a dynamic packet filtering algorithm of the modem 400 to distinguish the processing priority of the V2X safety packets 500. When the system resource is insufficient (e.g., an intelligent transportation module 310 of the processing unit 300 is judged to be unable to process all of the V2X safety packets 500 in real time), one part of the V2X safety packets 500 of the remote vehicles RV having a high impact on the driving safety (e.g., having small vehicle distances) is prioritized, and then the signatures of the part of the V2X safety packets 500 are verified to perform subsequent security judgment algorithms. Another part of the V2X safety packets 500 of the remote vehicles RV having a low impact on the driving safety (e.g., having large vehicle distances) can be selectively dropped according to the system resource, so that the computing resource (such as signature verification) is preferentially reserved for the part of the V2X safety packets 500 having a higher priority. Consequently, the present disclosure not only can improve overall safety, but also is suitable for a low-cost or low-order processing unit 300.

Figure 4:
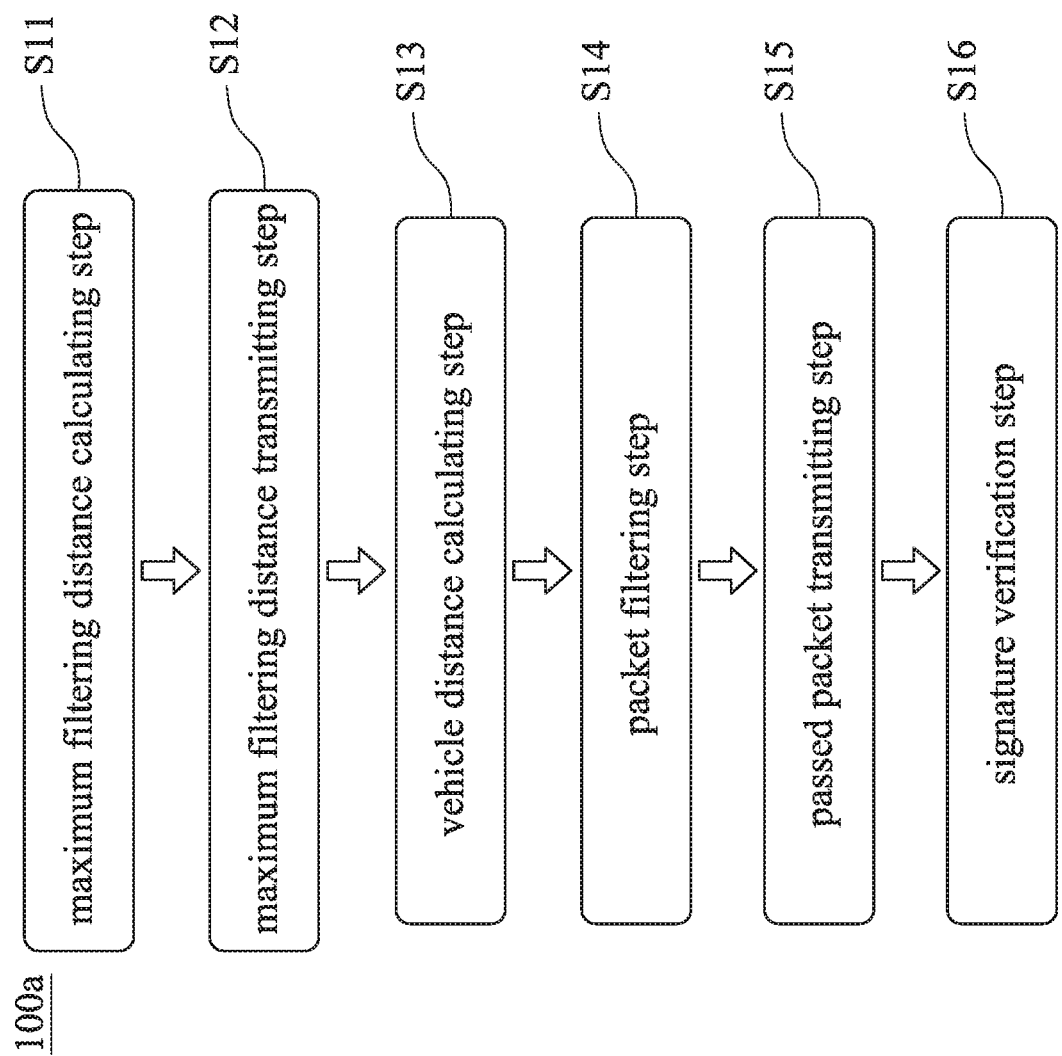
FIG. 4 shows a flow chart of a distance-based packet filtering method according to a third embodiment of the present disclosure.
Figure 5:
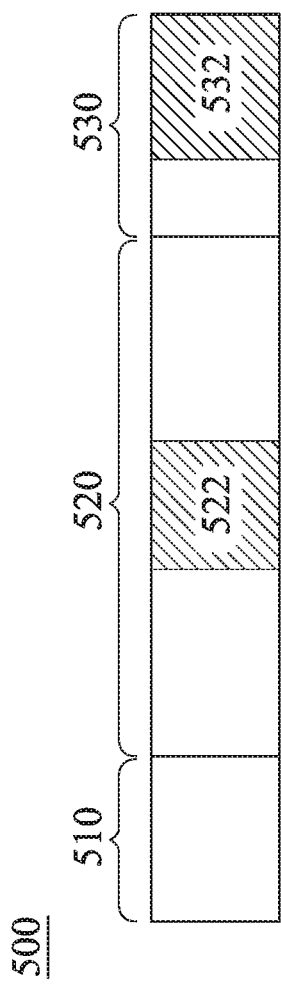
FIG. 5 shows a schematic view of a vehicle-to-everything safety packet of FIG. 3.

Please refer to FIGS. 2-6. FIG. 4 shows a flow chart of a distance-based packet filtering method 100a according to a third embodiment of the present disclosure. FIG. 5 shows a schematic view of a V2X safety packet 500 of FIG. 3. The number of the V2X safety packets 500 is plural. The modem 400 is configured to filter the V2X safety packets 500. The distance-based packet filtering method 100a of FIG. 4 is applied to the distance-based packet filtering system 200 of FIG. 3. The distance-based packet filtering method 100a includes a maximum filtering distance calculating step S11, a maximum filtering distance transmitting step S12, a vehicle distance calculating step S13, a packet filtering step S14, a passed packet transmitting step S15 and a signature verification step S16. The steps of the distance-based packet filtering method 100a are carried out in order of the maximum filtering distance calculating step S11, the maximum filtering distance transmitting step S12, the vehicle distance calculating step S13, the packet filtering step S14, the passed packet transmitting step S15 and the signature verification step S16.

The maximum filtering distance calculating step S11 includes configuring a processing unit 300 to calculate a maximum filtering distance d according to a dynamic adjustment distance parameter. The dynamic adjustment distance parameter includes a constant value β, a current vehicle velocity V, a number q of queueing packets and a load factor L of the processing unit 300. The maximum filtering distance d is calculated by the constant value β, the current vehicle velocity V, the number q of the queueing packets and the load factor L of the processing unit 300. The maximum filtering distance d is described as follows:

$$d=\beta \times (V)^{1/2} \div (q^2+L^2)^{1/2} \qquad (1).$$

The constant value β is determined by a V2X communication technology within the modem, and the V2X communication technology is one of a dedicated short range communication (DSRC) technology and a cellular vehicle-to-everything (CV2X) technology. In response to determining that the V2X communication technology is the DSRC technology, the constant value β is equal to 600. In response to determining that the V2X communication technology is the CV2X technology, the constant value f is equal to 1800. The current vehicle velocity V represents a current speed of the host vehicle HV. The unit of the current vehicle velocity V is "km/hr". The greater the current vehicle velocity V is, the greater the maximum filtering distance d is. The number q of the queueing packets represents the number of at least one packet to be processed by an intelligent transportation module 310 of the processing unit 300. The greater the number q of the queueing packets is, the smaller the maximum filtering distance d is. The load factor L of the processing unit 300 represents a utilization rate of the processing unit 300. The unit of the load factor L is %, i.e., 0%-100%. The greater the load factor L of the processing unit 300 is, the smaller the maximum filtering distance d is. The unit of the maximum filtering distance d is "meter". In response to determining that the V2X communication technology is the DSRC technology, the maximum filtering distance d is greater than or equal to 5 m and smaller than or equal to 300 m. In response to determining that the V2X communication technology is the CV2X technology, the maximum filtering distance d is greater than or equal to 10 m and smaller than or equal to 800 m. In other words, in response to determining that the V2X communication technology is the DSRC technology, if the maximum filtering distance d calculated by the equation (1) is smaller than 5 m, the maximum filtering distance d is selected as 5 m. If the maximum filtering distance d calculated by the equation (1) is greater than 300 m, the maximum filtering distance d is selected as 300 m. Similarly, in response to determining that the V2X communication technology is the CV2X technology, if the maximum filtering distance d calculated by the equation (1) is smaller than 10 m, the maximum filtering distance d is selected as 10 m. If the maximum filtering distance d calculated by the equation (1) is greater than 800 m, the maximum filtering distance d is selected as 800 m.

The maximum filtering distance transmitting step S12 includes configuring the processing unit 300 to transmit the maximum filtering distance d to the modem 400 for subsequent processing by the modem 400.

The vehicle distance calculating step S13 includes configuring the modem 400 to obtain a host vehicle location message and a plurality of V2X safety packets 500. Each of the V2X safety packets 500 includes a remote vehicle location message 522, and then the host vehicle location message and the remote vehicle location messages 522 of the V2X safety packets 500 are calculated to generate a plurality of vehicle distances D. The host vehicle location message represents a position coordinate (X1,Y1) of the host vehicle HV. The remote vehicle location message 522 represents a position coordinate (X2,Y2) of each of the remote vehicles RV, as shown in FIG. 6. Each of the vehicle distances D may be described as follows:

$$D=\alpha \times ((X1-X2)^2+(Y1-Y2)^2)^{1/2} \qquad (2).$$

Wherein α is a constant to convert the position coordinate (such as latitude and longitude) into the unit of an actual distance (such as meter).

The packet filtering step S14 includes configuring the modem 400 to compare each of the vehicle distances D with the maximum filtering distance d from the processing unit 300 to generate a comparison result, and judge whether each of the V2X safety packets 500 is the passed packet 500b according to the comparison result. In detail, in response to determining that the comparison result is that the vehicle distance D is greater than the maximum filtering distance d, the V2X safety packet 500 corresponding to the vehicle distance D is not the passed packet 500b and is a dropped packet 500a. On the contrary, in response to determining that the comparison result is that the vehicle distance D is smaller than or equal to the maximum filtering distance d, the V2X safety packet 500 corresponding to the vehicle distance D is the passed packet 500b. The dropped packet 500a represents a packet to be dropped without performing a signature verification. The dropped packet 500a is corresponding to a missed remote vehicle MRV. The passed packet 500b represents a packet to be reserved with performing the signature verification. The passed packet 500b is corresponding to a detected remote vehicle DRV. In other words, the remote vehicles RV include the missed remote vehicle MRV and the detected remote vehicle DRV. The V2X safety packets 500 may be divided into the dropped packets 500a and the passed packets 500b after the dynamic packet filtering algorithm of the modem 400 for subsequent processing.

The passed packet transmitting step S15 includes configuring the modem 400 to transmit the passed packets 500b to the processing unit 300.

The signature verification step S16 includes configuring the processing unit 300 to receive the passed packets 500b, and then perform the signature verification on the passed packets 500b. Therefore, the distance-based packet filtering method 100a of the present disclosure utilizes the dynamic packet filtering algorithm of the modem 400 to make sure that the processing unit 300 can reserve sufficient resources to process the part of the V2X safety packets 500 having the high impact on the driving safety, so that the present disclosure can improve the accuracy of judging the traffic conditions by the processing unit 300 and reduce the probability of failing to report a security threat, thereby improving overall safety. In addition, the present disclosure is suitable for a low-cost or low-order V2X processing system that includes a low-order processing unit 300 and has limited capability of performing the signature verification. Under limited conditions, the distance-based packet filtering method 100a of the present disclosure can make sure that the passed packets 500b can be processed in real time, and can still meet basic safety specifications under a low-cost or low-order system architecture.

Please refer to FIGS. 2, 3 and 5. The distance-based packet filtering system 200 is configured to filter a plurality of V2X safety packets 500 transmitted from a plurality of remote vehicles RV to a host vehicle HV. The distance-based packet filtering system 200 includes a processing unit 300 and a modem 400.

The processing unit 300 is disposed on the host vehicle HV. The processing unit 300 is configured to calculate a maximum filtering distance d according to a dynamic adjustment distance parameter. The processing unit 300 may be an external application processor (EAP), a personal computer, a microprocessor, a mobile device or one of other electronic computing processors. The processing unit 300 includes an intelligent transportation module 310 and a signature verification module 320. The intelligent transportation module 310 is signally connected between the signature verification module 320 and the modem 400. The intelligent transportation module 310 is configured to perform an intelligent transportation system software (ITS SW) and receive the passed packets 500b from the modem 400, and then the intelligent transportation module 310 parses a signature 532 in each of the passed packets 500b. The intelligent transportation module 310 transmits the signature 532 to the signature verification module 320. The signature verification module 320 checks the correctness of the signature 532 and returns a check result to the intelligent transportation module 310, so that the intelligent transportation module 310 is allowed to perform subsequent security judgment algorithms according to the check result.

The modem 400 is disposed on the host vehicle HV and signally connected to the processing unit 300 via a bus. The modem 400 is configured to obtain the V2X safety packets 500, and each of the V2X safety packets 500 includes a remote vehicle location message 522. The modem 400 obtains a host vehicle location message, the maximum filtering distance d and the V2X safety packets 500. The host vehicle location message and the remote vehicle location messages 522 are calculated to generate a plurality of vehicle distances D. Then, the modem 400 is configured to compare each of the vehicle distances D with the maximum filtering distance d to generate a comparison result, and judge whether each of the V2X safety packets 500 is a passed packet 500b according to the comparison result. In addition, the modem 400 uses a DSRC technology or a CV2X technology. The modem 400 includes an antenna 410, a modem processing module 420, and a distance filtering module 430. The antenna 410 receives the V2X safety packets 500. The modem processing module 420 is signally connected between the antenna 410 and the distance filtering module 430. The modem processing module 420 is configured to analyze the V2X safety packets 500 to output the remote vehicle location messages 522. The distance filtering module 430 is signally connected to the processing unit 300. The distance filtering module 430 obtains the host vehicle location message, the maximum filtering distance d and the V2X safety packets 500. The host vehicle location message and the remote vehicle location messages 522 are calculated to generate the vehicle distances D. Then, the distance filtering module 430 is configured to compare each of the vehicle distances D with the maximum filtering distance d to generate the comparison result, and judge whether each of the V2X safety packets 500 is the passed packet 500b according to the comparison result. The distance filtering module 430 is configured to divide the V2X safety packets 500 into the dropped packets 500a and the passed packets 500b. The dropped packets 500a may be dropped, and the passed packets 500b may be transmitted to the processing unit 300. Moreover, the bus between the processing unit 300 and the modem 400 can transmit the maximum filtering distance d from the processing unit 300 to the modem 400, and can also transmit the passed packets 500b from the modem 400 to the processing unit 300. In other words, the bus can transmit data in both directions. Therefore, the distance-based packet filtering system 200 of the present disclosure determines the importance of the V2X safety packets 500 according to the vehicle distance D between the remote vehicle RV and the host vehicle HV. When the system resource is insufficient for processing all of the V2X safety packets 500, the part of the V2X safety packets 500 of the remote vehicles RV having the low impact on the driving safety (e.g., having large vehicle distances) can be selectively dropped so as to improve overall safety.

Please refer to FIGS. 3 and 5. Each of the V2X safety packets 500 includes a security header 510, a V2X safety protocol data unit 520 and a security trailer 530. The V2X safety protocol data unit 520 is located between the security header 510 and the security trailer 530 and includes a remote vehicle location message 522. The security trailer 530 includes a signature 532. In one embodiment, the V2X safety packet 500 may be a basic safety message (BSM) packet of a SAE J2735 standard or a cooperative awareness message (CAM) packet of an ETSI standard. Therefore, the present disclosure preferentially calculates the maximum filtering distance d and then filters the dropped packets 500a including the vehicle distances D greater than the maximum filtering distance d. Finally, the signatures 532 of the passed packets 500b are verified so as to increase a percentage of processing the V2X safety packets 500 having small vehicle distances.

For example, it is assumed that the environment of FIG. 2 is a busy intersection. The host vehicle HV can receive the V2X safety packets 500 of one hundred remote vehicles RV around the host vehicle HV. A computing capability of the processing unit 300 can only handle the signature verification and subsequent security judgment algorithms of fifty remote vehicles RV. There are two areas (i.e., an inner circle and an outer ring) around the host vehicle HV, and the host vehicle HV is located as a center point. The inner circle has fifty remote vehicles RV, and the outer ring has another fifty remote vehicles RV. The time probability of sending the V2X safety packets 500 of the one hundred remote vehicles RV is randomly distributed. The security threat of the remote vehicles RV of the inner circle relative to the host vehicle HV is higher than the security threat of the remote vehicles RV of the outer ring relative to the host vehicle HV regardless of a vehicle direction and a vehicle speed. When using a conventional verification algorithm (without prioritizing by the maximum filtering distance d), only 50% of the V2X safety packets 500 of the remote vehicles RV in the inner circle can be processed, and another 50% of the V2X safety packets 500 of the remote vehicles RV in the inner circle cannot be processed due to limited capability of the system, thereby being easy to create a security breach. Accordingly, the present disclosure properly sets a range of the inner circle to the maximum filtering distance d so as to allow the part of the V2X safety packets 500 (i.e., the passed packets 500b) sent by the remote vehicles RV in the inner circle (i.e., the detected remote vehicles DRV) to be totally processed, thereby greatly improving system security.

Figure 7:
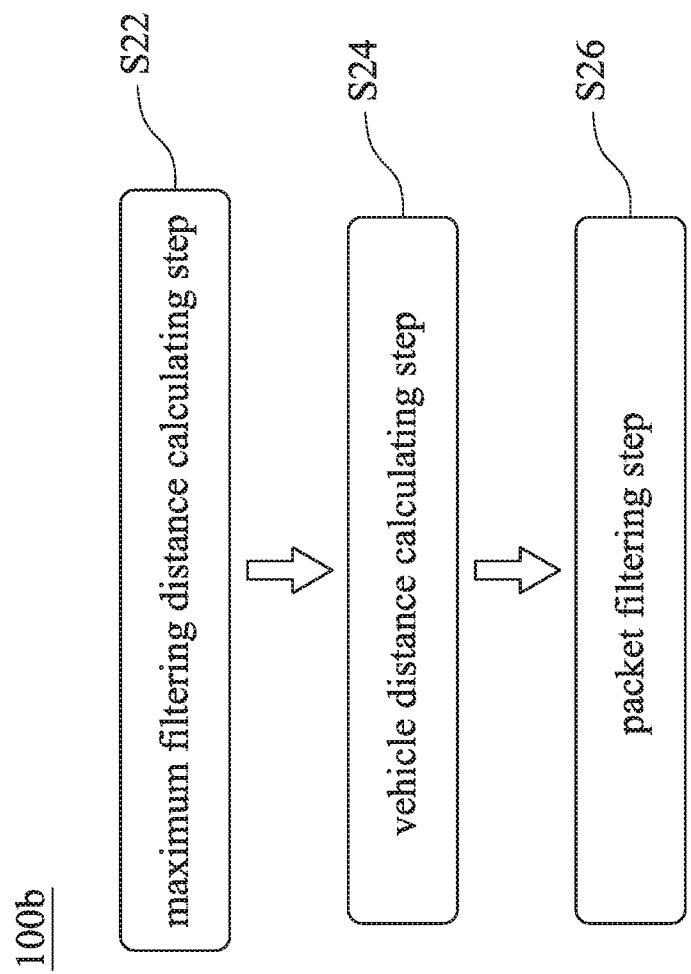
FIG. 7 shows a flow chart of a distance-based packet filtering method according to a fourth embodiment of the present disclosure.
Figure 8:
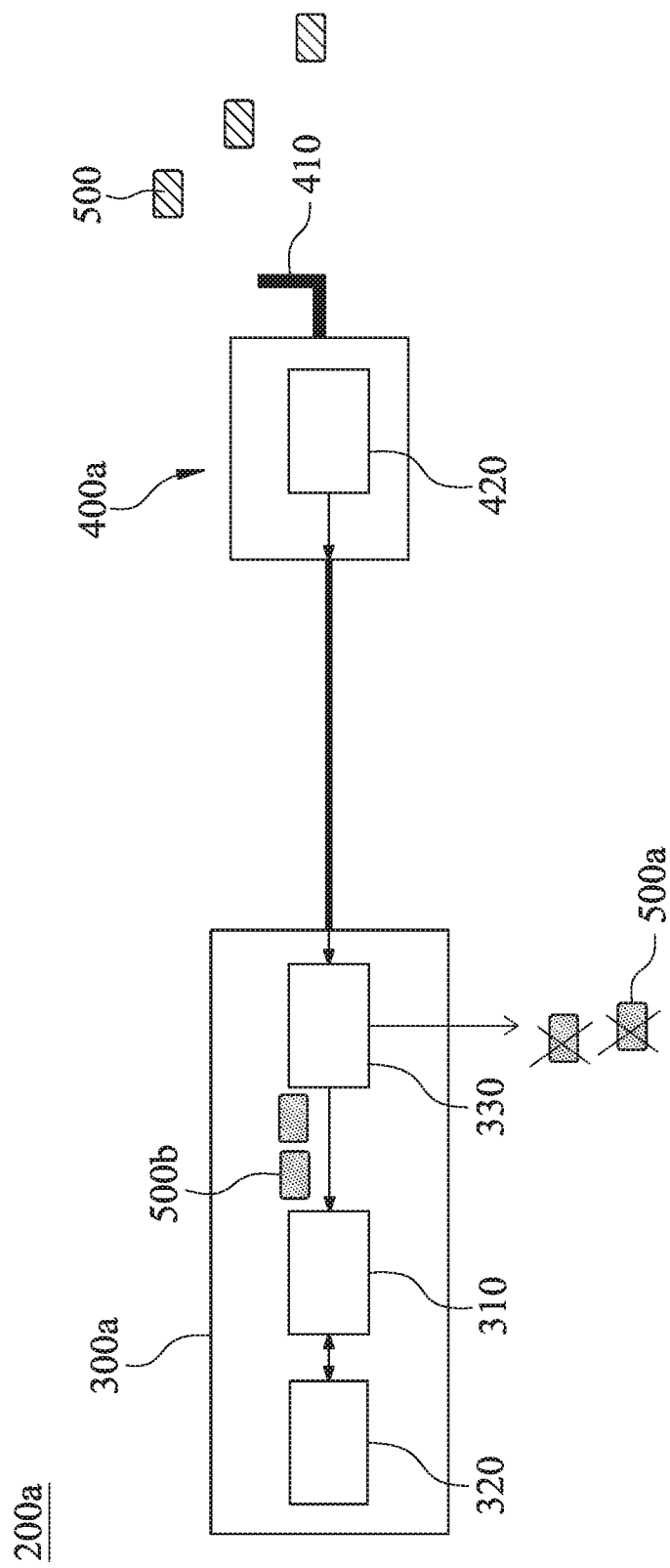
FIG. 8 shows a block diagram of a distance-based packet filtering system according to a fifth embodiment of the present disclosure.

Please refer to FIGS. 2 and 6-8. FIG. 7 shows a flow chart of a distance-based packet filtering method 100b according to a fourth embodiment of the present disclosure. FIG. 8 shows a block diagram of a distance-based packet filtering system 200a according to a fifth embodiment of the present disclosure. The distance-based packet filtering method 100b of FIG. 7 is applied to the distance-based packet filtering system 200a of FIG. 8, and a processing unit 300a is configured to filter at least one V2X safety packet 500. The distance-based packet filtering method 100b includes a maximum filtering distance calculating step S22, a vehicle distance calculating step S24 and a packet filtering step S26. The steps of the distance-based packet filtering method 100b are carried out in order of the maximum filtering distance calculating step S22, the vehicle distance calculating step S24 and the packet filtering step S26.

The maximum filtering distance calculating step S22 includes configuring the processing unit 300a to calculate a maximum filtering distance d according to a dynamic adjustment distance parameter. The dynamic adjustment distance parameter includes at least one of a current vehicle velocity, a number of queueing packets and a load factor of the processing unit 300a. In other embodiment, the maximum filtering distance d can be calculated by a modem 400a, but it is not limited thereto.

The vehicle distance calculating step S24 includes configuring the processing unit 300a to obtain a host vehicle location message and at least one V2X safety packet 500 from the modem 400a. The at least one V2X safety packet 500 includes at least one remote vehicle location message, and then the host vehicle location message and the at least one remote vehicle location message are calculated to generate at least one vehicle distance D.

The packet filtering step S26 includes configuring the processing unit 300a to compare the at least one vehicle distance D with the maximum filtering distance d from the processing unit 300a to generate a comparison result, and judge whether the at least one V2X safety packet 500 is the at least one passed packet 500b according to the comparison result. Therefore, the distance-based packet filtering method 100b of the present disclosure utilizes a dynamic packet filtering algorithm of the processing unit 300a to distinguish the processing priority of the V2X safety packets 500. When the system resource is insufficient, one part of the V2X safety packets 500 of the remote vehicles RV having a high impact on the driving safety (e.g., having small vehicle distances) is prioritized, and then the signatures of the part of the V2X safety packets 500 are verified to perform subsequent security judgment algorithms. Another part of the V2X safety packets 500 of the remote vehicles RV having a low impact on the driving safety (e.g., having large vehicle distances) can be selectively dropped according to the system resource, so that the computing resource is preferentially reserved for the part of the V2X safety packets 500 having a higher priority. Consequently, the present disclosure not only can improve overall safety, but also is suitable for a low-cost or low-order processing unit 300a.

Figure 9:
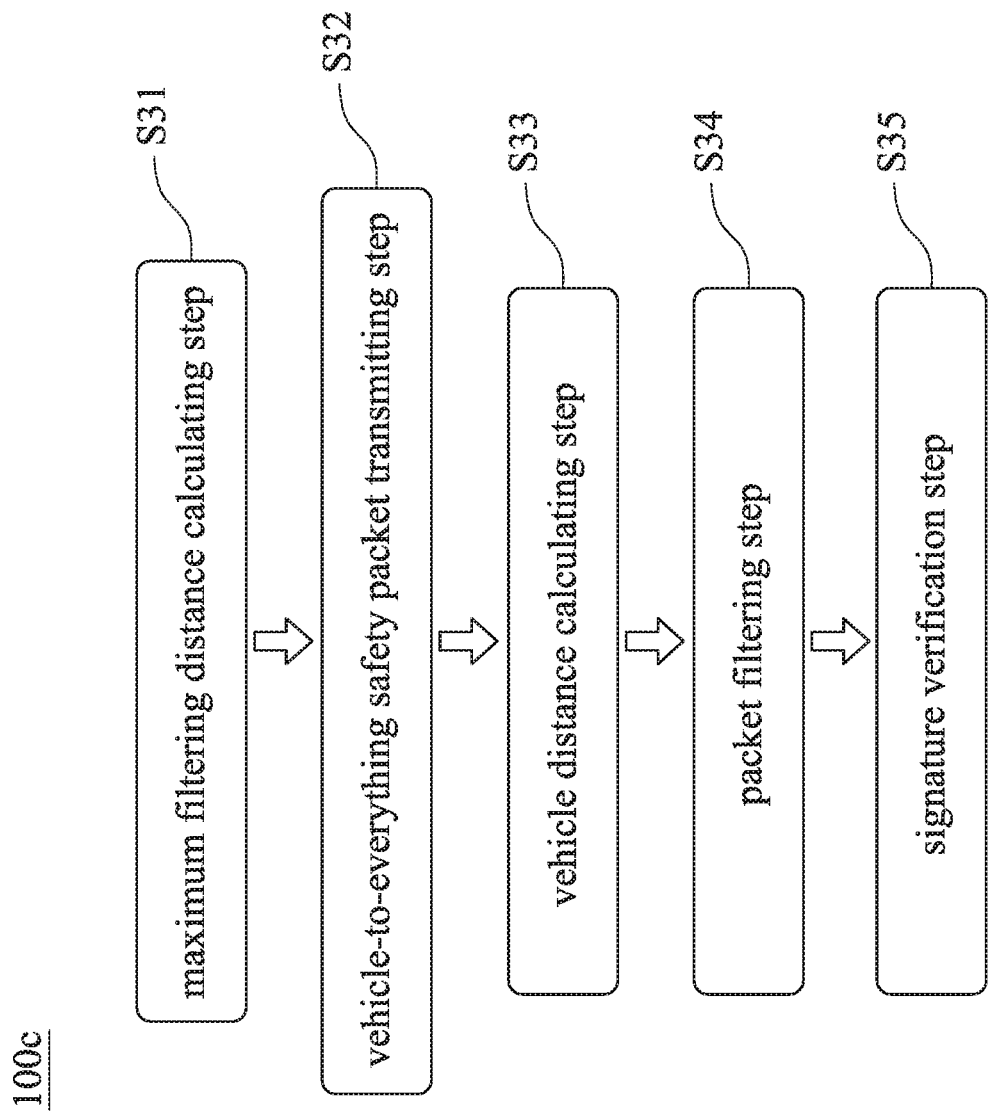
FIG. 9 shows a flow chart of a distance-based packet filtering method according to a sixth embodiment of the present disclosure.

Please refer to FIGS. 2, 5, 6, 8 and 9. FIG. 9 shows a flow chart of a distance-based packet filtering method 100c according to a sixth embodiment of the present disclosure. The number of the V2X safety packets 500 is plural. The processing unit 300a is configured to filter the V2X safety packets 500. The distance-based packet filtering method 100c of FIG. 9 is applied to the distance-based packet filtering system 200a of FIG. 8. The distance-based packet filtering method 100c includes a maximum filtering distance calculating step S31, a V2X safety packet transmitting step S32, a vehicle distance calculating step S33, a packet filtering step S34 and a signature verification step S35. The steps of the distance-based packet filtering method 100c are carried out in order of the maximum filtering distance calculating step S31, the V2X safety packet transmitting step S32, the vehicle distance calculating step S33, the packet filtering step S34 and the signature verification step S35.

In FIG. 9, the details of the maximum filtering distance calculating step S31 are the same as the maximum filtering distance calculating step S11 of FIG. 4. The maximum filtering distance calculating step S31 includes configuring the processing unit 300a to calculate a maximum filtering distance d according to a dynamic adjustment distance parameter, as shown in the equation (1), and the details are not described herein again.

The V2X safety packet transmitting step S32 includes configuring the modem 400a to transmit the V2X safety packets 500 to the processing unit 300a.

The vehicle distance calculating step S33 includes configuring the processing unit 300a to obtain a host vehicle location message and the V2X safety packets 500 from the modem 400a. Each of the V2X safety packets 500 includes a remote vehicle location message 522, and then the host vehicle location message and the remote vehicle location messages 522 of the V2X safety packets 500 are calculated to generate a plurality of vehicle distances D. Each of the vehicle distances D may be described as equation (2).

The packet filtering step S34 includes configuring the processing unit 300a to compare each of the vehicle distances D with the maximum filtering distance d from the processing unit 300a to generate a comparison result, and judge whether each of the V2X safety packets 500 is the passed packet 500b according to the comparison result. A difference between the packet filtering step S34 and the packet filtering step S14 of FIG. 4 is that the V2X safety packets 500 of the packet filtering step S34 are filtered by the dynamic packet filtering algorithm of a distance filtering module 330 of the processing unit 300a, and then the V2X safety packets 500 are divided into the dropped packets 500a and the passed packets 500b for subsequent processing.

The signature verification step S35 includes configuring the processing unit 300a to perform a signature verification on the passed packet 500b. Accordingly, the distance-based packet filtering method 100c of the present disclosure utilizes the dynamic packet filtering algorithm of the processing unit 300a to make sure that the processing unit 300a can reserve sufficient resources to process the part of the V2X safety packets 500 having the high impact on the driving safety, so that the present disclosure can improve the accuracy of judging the traffic conditions by the processing unit 300a and reduce the probability of failing to report a security threat, thereby improving overall safety. In addition, the present disclosure is suitable for a low-cost or low-order V2X processing system that includes a low-order processing unit 300a and has limited capability of performing the signature verification. Under limited conditions, the distance-based packet filtering method 100c of the present disclosure can make sure that the passed packets 500b can be processed in real time, and can still meet basic safety specifications under a low-cost or low-order system architecture.

Please refer to FIGS. 2, 5 and 8. The distance-based packet filtering system 200a is configured to filter a plurality of V2X safety packets 500 transmitted from a plurality of remote vehicles RV to a host vehicle HV. The distance-based packet filtering system 200 includes a processing unit 300a and a modem 400a.

The processing unit 300a is disposed on the host vehicle HV. The processing unit 300a is configured to calculate a maximum filtering distance d according to a dynamic adjustment distance parameter. The processing unit 300a may be an external application processor (EAP), a personal computer, a microprocessor, a mobile device or one of other electronic computing processors. The processing unit 300a includes an intelligent transportation module 310, a signature verification module 320 and a distance filtering module 330. The intelligent transportation module 310 is signally connected between the signature verification module 320 and the distance filtering module 330. The intelligent transportation module 310 is configured to perform an intelligent transportation system software (ITS SW) and receive the passed packets 500b from the distance filtering module 330, and then the intelligent transportation module 310 parses a signature 532 in each of the passed packets 500b. The intelligent transportation module 310 transmits the signature 532 to the signature verification module 320. The signature verification module 320 checks the correctness of the signature 532 and returns a check result to the intelligent transportation module 310, so that the intelligent transportation module 310 is allowed to perform subsequent security judgment algorithms according to the check result. In addition, the distance filtering module 330 is signally connected to the modem 400a. The distance filtering module 330 obtains the host vehicle location message, the maximum filtering distance d and the V2X safety packets 500. The host vehicle location message and the remote vehicle location messages 522 are calculated to generate the vehicle distances D. Then, the distance filtering module 330 is configured to compare each of the vehicle distances D with the maximum filtering distance d to generate the comparison result, and judge whether each of the V2X safety packets 500 is the passed packet 500b according to the comparison result. The distance filtering module 330 is configured to divide the V2X safety packets 500 into the dropped packets 500a and the passed packets 500b. The dropped packets 500a may be dropped, and the passed packets 500b may be transmitted to the intelligent transportation module 310.

The modem 400a is disposed on the host vehicle HV and signally connected to the processing unit 300a via a bus. The modem 400a is configured to obtain the V2X safety packets 500, and each of the V2X safety packets 500 includes a remote vehicle location message 522. The modem 400a uses a DSRC technology or a CV2X technology. The modem 400a includes an antenna 410 and a modem processing module 420. The antenna 410 receives the V2X safety packets 500. The modem processing module 420 is signally connected between the antenna 410 and the distance filtering module 330 of the processing unit 300a. The modem processing module 420 is configured to analyze the V2X safety packets 500 to output the remote vehicle location messages 522. The remote vehicle location messages 522 are then transmitted to the distance filtering module 330 via the bus for subsequent comparison. Therefore, the distance-based packet filtering system 200a of the present disclosure determines the importance of the V2X safety packets 500 according to the vehicle distance D between the remote vehicle RV and the host vehicle HV. When the system resource is insufficient for processing all of the V2X safety packets 500, the part of the V2X safety packets 500 of the remote vehicles RV having the low impact on the driving safety (e.g., having large vehicle distances) can be selectively dropped so as to improve overall safety.

According to the aforementioned embodiments and examples, the advantages of the present disclosure are described as follows.

1. The distance-based packet filtering method and the distance-based packet filtering system of the present disclosure utilize the dynamic packet filtering algorithm to make sure that the processing unit can reserve sufficient resources to process the part of the V2X safety packets having the high impact on the driving safety, so that the present disclosure can improve the accuracy of judging the traffic conditions by the processing unit and reduce the probability of failing to report a security threat, thereby improving overall safety.

2. The present disclosure is suitable for a low-cost or low-order V2X processing system that includes a low-order processing unit and has limited capability of performing the signature verification. Under limited conditions, the distance-based packet filtering method and the distance-based packet filtering system of the present disclosure can make sure that the passed packets can be processed in real time, and can still meet basic safety specifications under a low-cost or low-order system architecture.

3. The present disclosure is applicable to different automotive ITS applications for the SAE/IEEE 1609 standard, the ETSI ITS-G5 standard or the China cooperative ITS standard.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A distance-based packet filtering method, comprising:
performing a maximum filtering distance calculating step to configure a processor to calculate a maximum filtering distance according to a dynamic adjustment distance parameter;
performing a vehicle distance calculating step to configure a modem to obtain a host vehicle location message and at least one vehicle-to-everything (V2X) safety packet,
wherein the at least one V2X safety packet comprises at least one remote vehicle location message, and then the host vehicle location message and the at least one remote vehicle location message are calculated to generate at least one vehicle distance; and
performing a packet filtering step to configure the modem to compare the at least one vehicle distance with the maximum filtering distance from the processor to generate a comparison result, and judge whether the at least one V2X safety packet is at least one passed packet according to the comparison result,
wherein the dynamic adjustment distance parameter comprises at least one of a current vehicle velocity, a number of queueing packets and a load factor of the processor;
wherein the maximum filtering distance is calculated by a constant value, the current vehicle velocity, the number of the queueing packets and the load factor of the processor, the constant value is represented as p, the current vehicle velocity is represented as V, the number of the queueing packets is represented as q, the load factor of the processor is represented as L, and the maximum filtering distance is represented as d and described as follows: d=f×(V) i/2(q2+L2)i/2.

2. The distance-based packet filtering method of claim 1, wherein,
the constant value is determined by a V2X communication technology within the modem, and the V2X communication technology is one of a dedicated short range communication (DSRC) technology and a cellular vehicle-to-everything (CV2X) technology;
in response to determining that the V2X communication technology is the DSRC technology, the maximum filtering distance is greater than or equal to 5 m and smaller than or equal to 300 m;

and in response to determining that the V2X communication technology is the CV2X technology, the maximum filtering distance is greater than or equal to 10 m and smaller than or equal to 800 m.

3. The distance-based packet filtering method of claim 1, wherein the modem uses a dedicated short range communication (DSRC) technology or a cellular vehicle-to-everything (CV2X) technology.

4. The distance-based packet filtering method of claim 1, further comprising:

performing a maximum filtering distance transmitting step to configure the processor to transmit the maximum filtering distance to the modem;

and performing a passed packet transmitting step to configure the modem to transmit the at least one passed packet to the processor;

wherein the passed packet transmitting step is performed after the packet filtering step.

5. The distance-based packet filtering method of claim 1, further comprising:

performing a signature verification step to configure the processor to receive the at least one passed packet, and then perform a signature verification on the at least one passed packet;

wherein the signature verification step is performed after the packet filtering step.

6. The distance-based packet filtering method of claim 1, wherein in the packet filtering step, in response to determining that the comparison result is that the at least one vehicle distance is greater than the maximum filtering distance, the at least one V2X safety packet is not the at least one passed packet;

and in response to determining that the comparison result is that the at least one vehicle distance is smaller than or equal to the maximum filtering distance, the at least one V2X safety packet is the at least one passed packet.

7. A distance-based packet filtering method, comprising:

performing a maximum filtering distance calculating step to configure a processor to calculate a maximum filtering distance according to a dynamic adjustment distance parameter;

performing a vehicle distance calculating step to configure the processor to obtain a host vehicle location message and at least one vehicle-to-everything (V2X) safety packet from a modem, wherein the at least one V2X safety packet comprises at least one remote vehicle location message, and then the host vehicle location message and the at least one remote vehicle location message are calculated to generate at least one vehicle distance;

and performing a packet filtering step to configure the processor to compare the at least one vehicle distance with the maximum filtering distance to generate a comparison result, and judge whether the at least one V2X safety packet is at least one passed packet according to the comparison result;

wherein the dynamic adjustment distance parameter comprises at least one of a current vehicle velocity, a number of queueing packets and a load factor of the processor;

wherein the maximum filtering distance is calculated by a constant value, the current vehicle velocity, the number of the queueing packets and the load factor of the processor, the constant value is represented as 1, the current vehicle velocity is represented as V, the number of the queueing packets is represented as p, the load factor of the processor is represented as L, and the maximum filtering distance is represented as d and described as follows: $d \times (V)1/2, (2+L2/2$.

8. The distance-based packet filtering method of claim 7, wherein, the constant value is determined by a V2X communication technology within the modem, and the V2X communication technology is one of a dedicated short range communication (DSRC) technology and a cellular vehicle-to-everything (CV2X) technology;

in response to determining that the V2X communication technology is the DSRC technology, the maximum filtering distance is greater than or equal to 5 m and smaller than or equal to 300 m;

and in response to determining that the V2X communication technology is the CV2X technology, the maximum filtering distance is greater than or equal to 10 m and smaller than or equal to 800 m.

9. The distance-based packet filtering method of claim 7, wherein the modem uses a dedicated short range communication (DSRC) technology or a cellular vehicle-to-everything (CV2X) technology.

10. The distance-based packet filtering method of claim 7, further comprising:

performing a V2X safety packet transmitting step to configure the modem to transmit the at least one V2X safety packet to the processor;

wherein the V2X safety packet transmitting step is performed before the vehicle distance calculating step.

11. The distance-based packet filtering method of claim 7, further comprising:

performing a signature verification step to configure the processor to perform a signature verification on the at least one passed packet;

wherein the signature verification step is performed after the packet filtering step.

12. The distance-based packet filtering method of claim 7, wherein in the packet filtering step, in response to determining that the comparison result is that the at least one vehicle distance is greater than the maximum filtering distance, the at least one V2X safety packet is not the at least one passed packet; and in response to determining that the comparison result is that the at least one vehicle distance is smaller than or equal to the maximum filtering distance, the at least one V2X safety packet is the at least one passed packet.

13. A distance-based packet filtering system, which is configured to filter at least one vehicle-to-everything (V2X) safety packet transmitted from at least one remote vehicle to a host vehicle, a memory and the distance-based packet filtering system comprising:

a processor disposed on the host vehicle, wherein the processor is configured to calculate a maximum filtering distance according to a dynamic adjustment distance parameter; and a modem disposed on the host vehicle and signally connected to the processor, wherein the modem is configured to obtain at least one V2X safety packet, and the at least one V2X safety packet comprises at least one remote vehicle location message;

wherein one of the processor and the modem obtains a host vehicle location message, the maximum filtering distance and the at least one V2X safety packet, the host vehicle location message and the at least one remote vehicle location message are calculated to generate at least one vehicle distance, and then the one of the processor and the modem is configured to compare the at least one vehicle distance with the maximum filtering distance to generate a comparison result, and judge whether the at least one V2X safety packet is at least one passed packet according to the comparison result;

wherein the dynamic adjustment distance parameter comprises at least one of a current vehicle velocity, a number of queueing packets and a load factor of the processor;

wherein the maximum filtering distance is calculated by a constant value, the current vehicle velocity, the number of the queueing packets and the load factor of the processor, the constant value is represented as 1, the current vehicle velocity is represented as V, the number of the queueing packets is represented as p, the load factor of the processor is represented as L, and the maximum filtering distance is represented as d and described as follows: d 3p×(V)u1/27 (2+L2)/2.

14. The distance-based packet filtering system of claim 13, wherein, in response to determining that the comparison result is that the at least one vehicle distance is greater than the maximum filtering distance, the at least one V2X safety packet is not the at least one passed packet; and in response to determining that the comparison result is that the at least one vehicle distance is smaller than or equal to the maximum filtering distance, the at least one V2X safety packet is the at least one passed packet.

* * * * *